United States Patent [19]

Hirata

[11] 4,310,918

[45] Jan. 12, 1982

[54] TONE ARM DRIVING APPARATUS

[75] Inventor: Isao Hirata, Tokyo, Japan

[73] Assignee: Sony Corporation, Tokyo, Japan

[21] Appl. No.: 92,638

[22] Filed: Nov. 8, 1979

[30] Foreign Application Priority Data

Nov. 15, 1978 [JP] Japan ............................. 53-140672

[51] Int. Cl.³ ............................................. G11B 3/08
[52] U.S. Cl. .................................... 369/215; 369/225
[58] Field of Search ....................... 274/13 R, 14, 15 R,
274/23 R; 369/215, 225, 230

[56] References Cited

U.S. PATENT DOCUMENTS

| | | | |
|---|---|---|---|
| 3,926,440 | 12/1975 | Wren | 274/14 |
| 4,023,130 | 5/1977 | Ridler et al. | 274/23 R |
| 4,132,935 | 1/1979 | Gaus et al. | 274/15 R |
| 4,143,879 | 3/1979 | Wren | 274/23 R |
| 4,214,756 | 7/1980 | Ohmura | 274/13 R |

FOREIGN PATENT DOCUMENTS

| | | | |
|---|---|---|---|
| 570106 | 8/1977 | U.S.S.R. | 274/23 R |
| 585.521 | 12/1977 | U.S.S.R. | 274/23 R |

*Primary Examiner*—John W. Shepperd
*Attorney, Agent, or Firm*—Hill, Van Santen, Steadman, Chiara & Simpson

[57] ABSTRACT

A tone arm, designed for use with a semi- or fully automatic record player, is provided with an electromagnetic drive mechanism. The tone arm is supported by two separate shafts so as to be rotatable in both the horizontal and vertical directions. A bobbin, to which horizontal and vertical drive coils are circumferentially attached, is arranged coaxially with that shaft permitting horizontal movement. A permanent magnet is arranged facing the drive coils. Interaction between the permanent magnetic field and those generated by energization of the drive coils causes either a torque or a vertical force to be imparted to the bobbin and thus effect a corresponding movement of the tone arm.

10 Claims, 12 Drawing Figures

TONE ARM DRIVING APPARATUS

BACKGROUND OF THE INVENTION

1. Field of the Invention

This invention relates to a tone arm driving apparatus, and more particularly to an electromagnetic tone arm driving apparatus for a phonographic record player.

2. Description of the Prior Art

In a conventional tone arm driving apparatus for a fully automatic record player, rotational energy from the turn table or a special, separate electric motor is used as a drive source for driving the tone arm. The tone arm is driven by the drive source through mechanical transmitting means such as gears, cams, and links. The record player is so designed as to perform various operations such as "lead-in operation," "reject operation," "auto-return operation," "arm-up operation" and "arm-down operation" by driving the tone arm.

Since the tone arm is driven through a mechanical construction, the tone arm driving apparatus has a slow or retarded response due to the cams and gears. Many times an operating button must be depressed for a considerably long period of time to perform a necessary operation. Further, the tone arm driving apparatus is complicated in construction, troublesome to assemble, and the amount of labor required for adjustment is large. Finally, it is relatively expensive.

In consideration of the above described problems, attempts to electromagnetically drive a tone arm have been made. For example, in the German Auslegeschrift No. 1,917,241, a bobbin, to which a pair of sectorial coils are attached, is fixed to a horizontal drive shaft for a tone arm, and a permanent magnet is arranged facing the coils. When one of the coils is energized, a horizontal drive force is obtained to horizontally rotate the tone arm. At this time, the horizontal rotational speed of the tone arm is detected by the other coil.

A leaf spring is provided for controlling the vertical rotation of the tone arm. A wire is connected to the top end of the leaf spring so as to elastically bias the leaf spring downwardly. When a current is supplied to the wire, the latter generates heat and expands. The leaf spring is elastically restored with the expansion of the wire. The tone arm is moved upwardly with the restoration of the leaf spring. Thus, the vertical drive of the tone arm is not performed in electro-magnetic manner. Additionally, the number of parts is large, the apparatus is retarded in response, and further, it does not have a long useful life.

SUMMARY OF THE INVENTION

An object of this invention is to provide a tone arm driving apparatus which is simple in construction.

Another object of this invention is to provide a tone arm driving apparatus which is compact in construction.

A further object of this invention is to provide a tone arm driving apparatus which is inexpensive.

A still further object of this invention is to provide a tone arm driving apparatus in which a tone arm is rotated horizontally and vertically in an electro-magnetic manner.

A still further object of this invention is to provide a tone arm driving apparatus whose response time is short, and which can perform a complicated operation.

In accordance with an aspect of this invention, a tone arm driving apparatus includes a tone arm supported by first and second axises so as to be rotatable in both the horizontal and vertical directions; a cylindrical bobbin arrangement concentrically with and supported by the first axis, so as to be rotatable around the first axis and slidable in the vertical direction; horizontal and vertical drive coils attached to the bobbin; a stationary, permanent magnet arranged facing the horizontal and vertical drive coils to interlink the magnetic fluxes from the magnet with the horizontal and vertical drive coils; means for supplying currents to the horizontal and vertical drive coils to generate electromagnetic forces for imparting a torque and a vertical drive force to the bobbin; and another means for transmitting the torque and vertical drive force to the tone arm.

Other objects, features, and advantages of the present invention will be apparent from the following description taken in conjunction with the accompanying drawings, with the novel features particularly pointed out in the appended claims.

DETAILED DESCRIPTION OF THE PREFERRED EMBODIMENTS

Embodiments of this invention will now be described with reference to the drawings.

Figure 1:
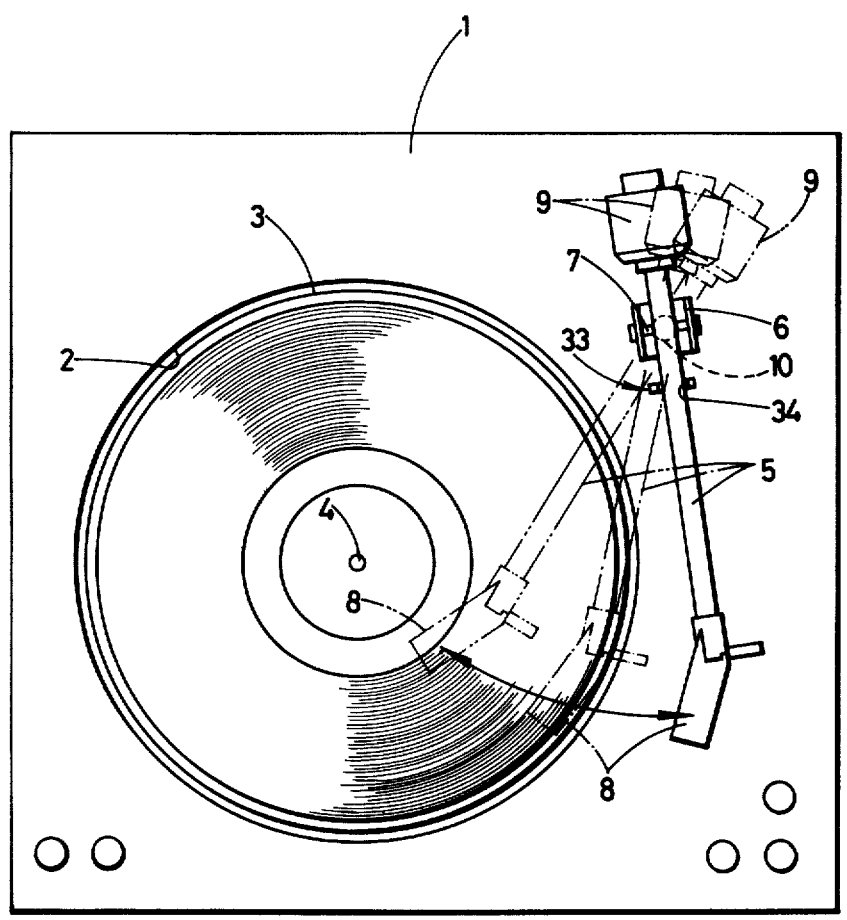
FIG. 1 is a plan view of a record player to which one embodiment of this invention is applied.

FIGS. 1 to 5 show one embodiment of this invention. Referring to FIG. 1, a circular opening 2 is made in an upper panel 1 in a record player, and a turntable 3 is arranged at the circular opening 2. The turntable 3 is rotatably supported by a spindle 4 in the well known manner. A tone arm 5 is arranged at the side of the turntable 3, and it is supported by a pivot axis 7 fixed to an arm support bracket 6. A cartridge 8 provided with a stylus is mounted on one end of the tone arm 5. A balance weight 9 is mounted on another end of the tone arm 5.

Figure 2:
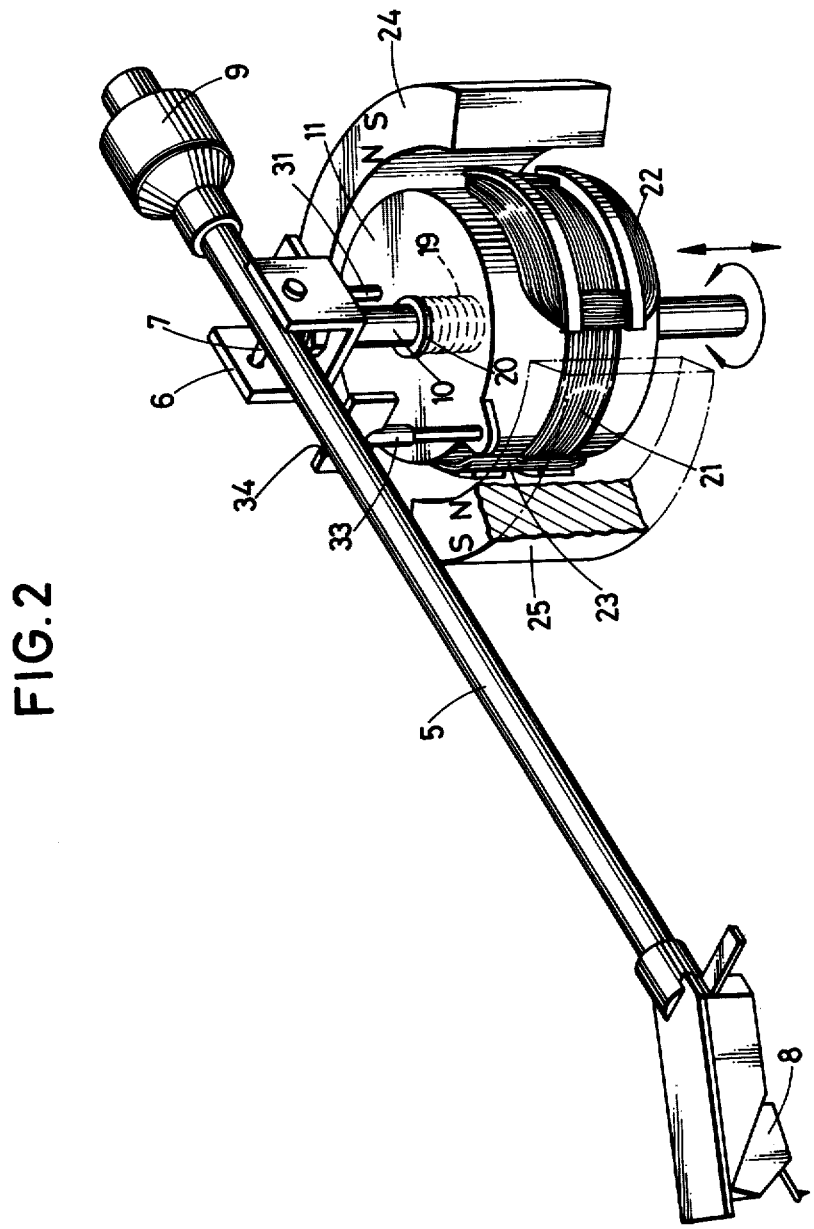
FIG. 2 is a perspective view of a tone arm driving apparatus according to one embodiment of this invention.
Figure 3:
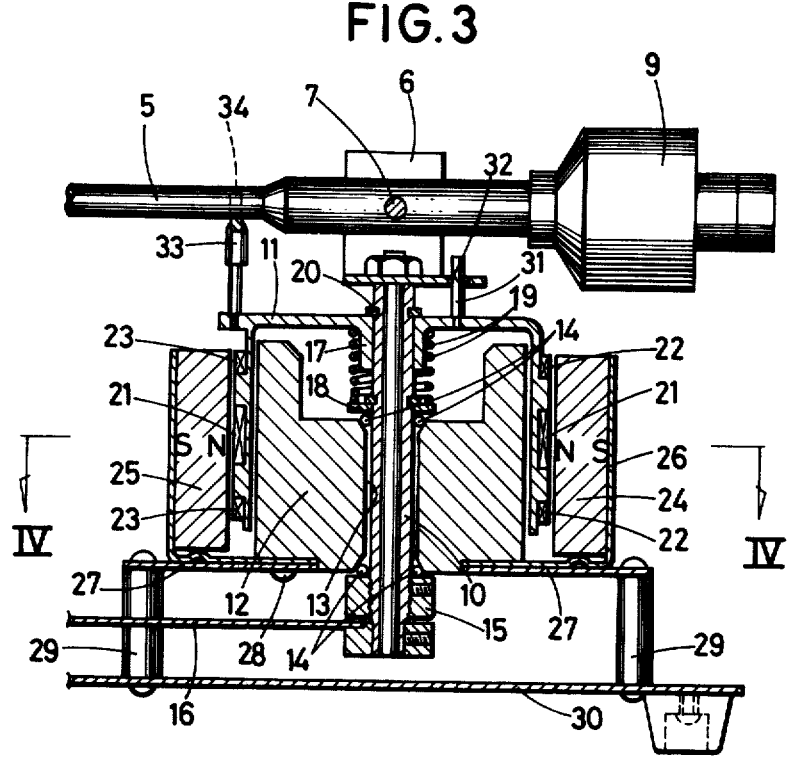
FIG. 3 is a cross-sectional view of the apparatus of FIG. 2.
Figure 4:
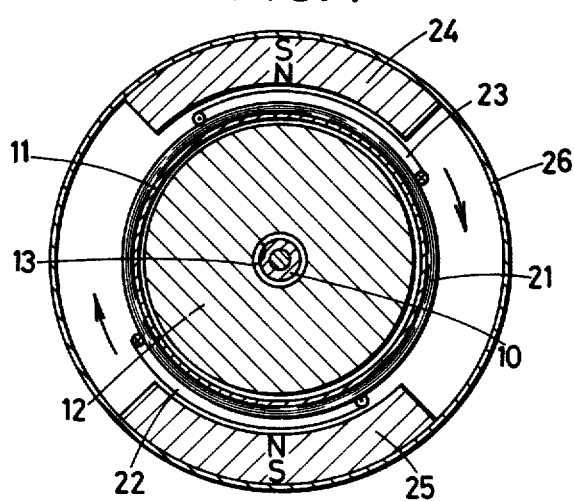
FIG. 4 is a cross-sectional view taken along the line IV—IV on FIG. 2.

A tone arm driving apparatus for driving the tone arm 5, which is arranged under the arm support bracket 6, will be described with reference to FIGS. 2 to 4. The arm support bracket 6 is fixed to an upper end of a vertical shaft 10 for horizontal rotation of the tone arm 5. The vertical shaft 10 passes through a central opening of a cup-shaped bobbin 11, made of synthetic resin, and further through a piercing hole 13 made in the center of a yoke 12 which is arranged within the bobbin 11. The vertical shaft 10 is supported by a pair of ball bearings 14 so as to be rotatable relative to the yoke 12. A thrust bearing nut 15 and a shutter 16 for detecting the size of a record disc are fixed to the lower end of the vertical shaft 10. An upper end portion of the vertical shaft 10 is fitted into a boss portion 17 of the bobbin 11. A thrust bearing plate 18 is fixed to the vertical shaft 10 under the boss portion 17. A vertical space is formed between the lower end of the boss portion 17 and the thrust bearing plate 18. The bobbin 11 is so supported as to be slidable along the axial direction of the vertical shaft 10 within the vertical space. A coil spring 19 is arranged between the boss portion 17 and the thrust bearing plate 18 to bias the bobbin 11 upwards along the axial direction of the vertical shaft 10. A stopper ring 20 is fixed to the upper end portion of the vertical shaft 10 to contact with the upper surface of the bobbin 11 and thereby to regulate or limit the upper position of the bobbin 11.

A vertical drive coil 21 is wound on the bobbin 11 in the peripheral direction of the latter. Further, a pair of horizontal drive coils 22 and 23 having substantially rectangular shape are attached to the circumferential surface of the bobbin 11, diametrically with respect to the vertical drive shaft 10. A pair of segmental permanent magnets 24 and 25 are arranged concentrically with the bobbin 11, facing the coils 21, 22 and 23 attached to the bobbin 11. The magnets 24 and 25 are so magnetized in the radial direction that the inner circumferential surfaces are of north polarity and the outer circumferential surfaces are of south polarity. Since the inner circumferential surfaces of the two magnets 24 and 25 are of the same polarity, forces in the same direction are imparted to the bobbin 11 by the vertical drive coil 21 and two magnets 24 and 25.

The magnets 24 and 25 are received by a cup-shaped magnet case 26 which is fixed at its bottom to the yoke 12 and a magnet case mounting plate 27 by screws 28. The yoke 12, the magnet case 26 and the magnet case mounting plate 27 constitute main portions of magnetic paths for the magnets 24 and 25. The magnet case mounting plate 27 is supported through mounting legs 29 by a bottom plate 30 of the record player.

Figure 5:
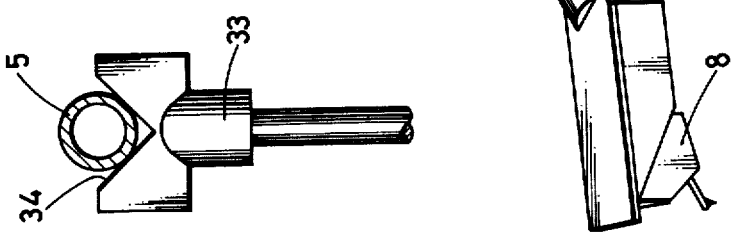
FIG. 5 is an enlarged front view of an arm lifter in the apparatus of FIG. 2.

A pin 31 is fixed on the upper surface of the bobbin 11, and fitted in and received by a small opening 32 made in the arm support bracket 6. The rotation of the bobbin 11 is transmitted through the pin 31 to the arm support bracket 6. Further, an arm lifter 33 is fixed on the upper surface of the bobbin 11. A V-shaped recess 34 is formed in an upper edge portion of the arm lifter 33 by which the tone arm 5 is received, as shown in FIG. 5.

Operation of the above described arm driving apparatus proceeds as follows:

First, a description of where the tone arm 5 is rotated in the horizontal direction. For playing the record, the tone arm 5 is horizontally and inwardly rotated from the arm rest position, shown by the solid line in FIG. 1. The horizontal drive coils 22 and 23 are energized for horizontally driving the tone arm 5. In accordance with Fleming's left hand rule, a rotational torque in the direction shown by the arrow in FIG. 4 is imparted to the bobbin 11, to which the coils 22 and 23 are attached. Accordingly, the bobbin 11 is rotated around the central axis of the vertical shaft 10. The rotation of the bobbin 11 is transmitted through the pin 31 and small opening 32 to the arm support bracket 6 to rotate the tone arm 5. The tone arm 5 is rotated within the range of about 60 degrees. The direction of the horizontal rotation or the tone arm 5 is changed by changing the direction of current supplied to the coils 22 and 23. Thus, the so-called "lead-in operations," "rejecting operations" and "return operations" can be performed by use of the coils 22 and 23.

Next, a description of where the tone arm 5 is rotated in the vertical direction. When the tone arm 5, horizontally rotated to the position shown by the dot-dash line in FIG. 1, is rotated vertically downwards to contact the stylus of the cartridge 8 with a predetermined position of the record disc, the vertical drive coil 21 is energized. A downward force in the axial direction of the vertical shaft 10 is imparted to the bobbin 11 with the energization of the vertical drive coil 21. Accordingly, the bobbin 11 is moved downwards against the coil spring 19, compressing the latter. The arm lifter 33 fixed on the bobbin 11 is moved downwards and permits the tone arm 5 to rotate around the pivot axis 7. The stylus of the cartridge 8 is moved downwards and into contact with the record disc. Since the inward circumferences of the magnets 24 and 25 facing the vertical drive coils 21 are of the same polarity, namely N-polarity, the forces generated by interaction of magnetic fluxes from the magnets 24 and 25, with the energized coil 21 are in the same direction, namely in the downward direction. If the inward circumferences of the magnets 24 and 25 were of the opposite polarities, the forces generated by interaction of magnetic fluxes from the magnets 24 and 25 with the energized coil 21 would cancel each other.

In the downward movement of the tone arm 5, the latter is supported by the pivot axis 7 and the recess 34 of the arm lifter 33, until the stylus of the cartridge 8 makes contact with the record disc. After the stylus of the cartridge 8 contacts the record disc, the tone arm 5 is separated from the arm lifter 33 by the downward movement of the bobbin 11.

When the horizontal rotation of the bobbin 11 is stopped with a stop signal from a not-shown electric control circuit, a further horizontal rotation of the tone arm 5 due to inertia can be prevented by the V-shaped recess 34 of the arm lifter 33. Oscillation of the tone arm 5 is also thereby prevented when the horizontal rotation of the tone arm 5 is stopped. Thus, the tone arm 5 can be smoothly operated. Also rocking of the tone arm 5 due to a play between the pivot axis 7 and holes of the arm support bracket 6 for supporting the pivot axis 7 can be prevented by the V-shaped recess 34 of the arm lifter 33. If such rocking occurs, there is the possibility that the stylus of the cartridge 8 is greatly deflected from the predetermined position on the record disc, since any rocking is amplified at the stylus due to the distance from the pivot axis 7. Thus, the drop point of the stylus onto the record disc is determined with accuracy by the V-shaped recess 34 of the arm lifter 33. The stylus can be positioned onto the outermost of the sound grooves or onto an intermediate sound groove between the tracks or bands of recorded music with accuracy. The recess 34 of the arm lifter 33 can be formed by a metallic mold without a further increase of cost.

When separation of the stylus of the cartridge 8 from the record disc is desired, the coil 21 is deenergized. The vertical downward force on the bobbin 11 disappers. Accordingly, the bobbin 11 is moved upward along the axis of the vertical shaft 10 by spring action of the coil spring 19, and the tone arm 5 is pushed upwards by the arm lifter 33 attached to the bobbin 11. The tone arm 5 is rotated around the pivot axis 7 and separates the stylus of the cartridge 8 from the record disc. Thus, the tone arm 5 is always moved upward with the deenergization of the coil 21. Accordingly, when the electric power gives out or when the power supply cord is accidentally pulled out from the plug socket while a record is being played, there is no danger of damage to either the stylus on the record because of prolonged, static contact between them.

In the arm driving apparatus of this embodiment, the forces imparted to the bobbin 11 by the energized horizontal drive coils 22 and 23, or the vertical drive coil 21 and the magnets 24 and 25 are transmitted almost directly to the tone arm 5 to horizontally or vertically rotate the latter. There is no significant mechanical transmitting device, (for example, cams and gears), in the arm driving apparatus. Accordingly, it is superior in response and can be smoothly and rapidly operated for the control of the tone arm 5. Further, as is shown in FIG. 2 to FIG. 4, the arm driving apparatus is simple in construction and can be easily assembled with a small number of labor-intensive construction steps. It can be made compact, is superior in space factor, and it is low in cost.

In the above embodiment, the pair of horizontal drive coils 22 and 23 for horizontally rotating the tone arm 5 are attached on the circumferential surface of the bobbin 11. However, one of the horizontal drive coils 22 and 23 may be disconnected from the activating current and instead used as an inductive detecting coil. When the tone arm 5 is rotated horizontally, the inductive detecting coil is used for servo-control to rotate the tone arm 5 at a constant speed in the horizontal direction. When the tone arm 5 stops, the inductive detecting coil is used as a servo-control to maintain the tone arm 5 at the stop position. At the end of the record, the inductive detecting coil is used for detecting the rotational speed of the tone arm 5 at the innermost of the sound grooves of the record disc, and thereby for detecting the end of the record disc.

Figure 6:
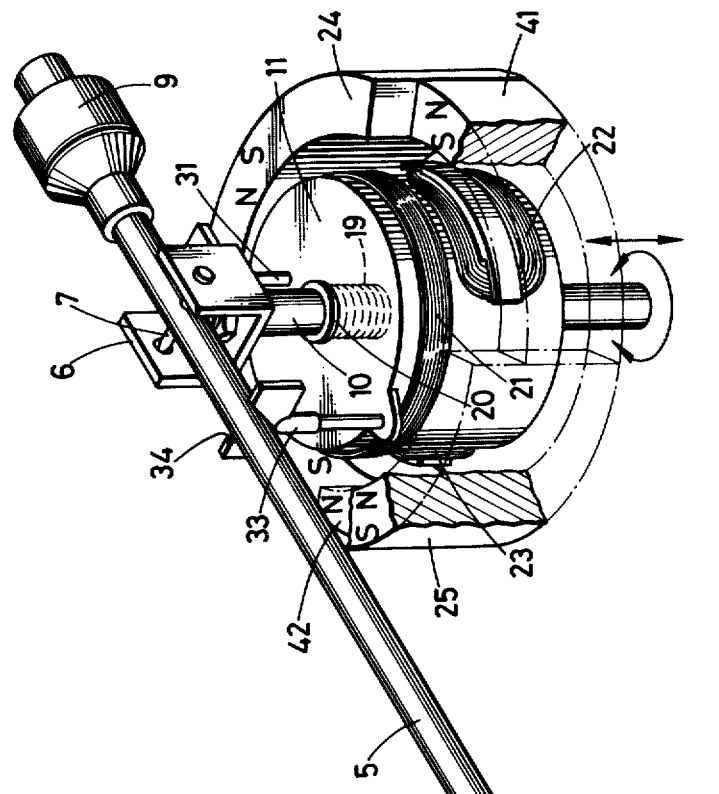
FIG. 6 is a perspective view of a tone arm driving apparatus according to another embodiment of this invention.
Figure 7:
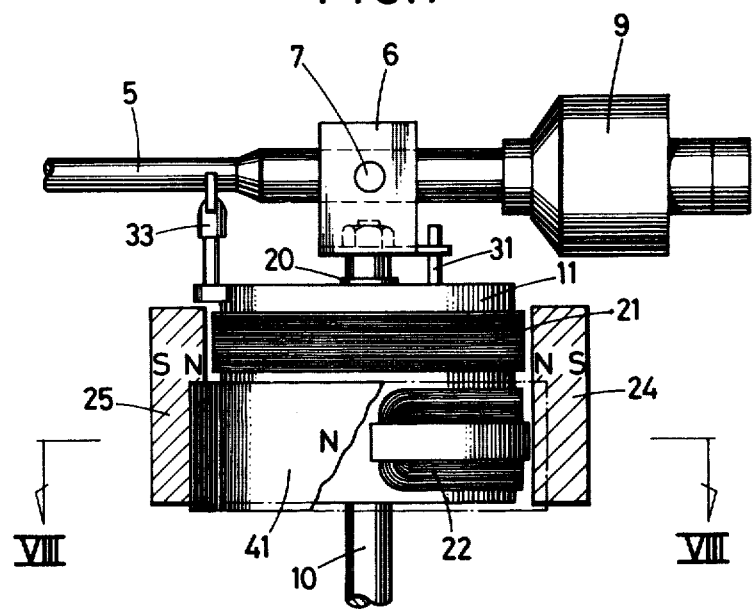
FIG. 7 is a side view of the apparatus of FIG. 6.
Figure 8:
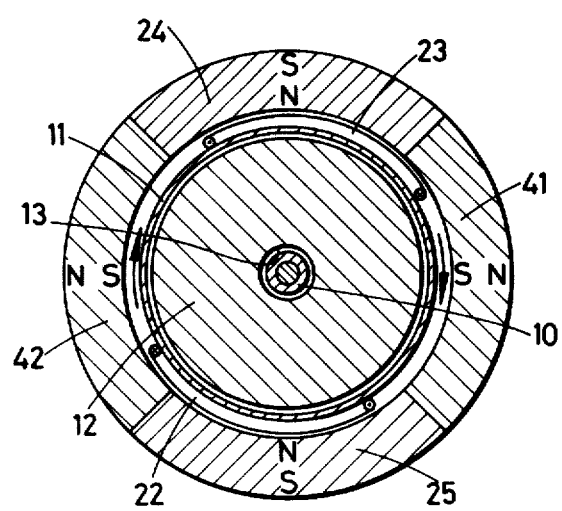
FIG. 8 is a cross-sectional view taken along the line VIII—VIII on FIG. 7.

Next, another embodiment of this invention will be described with reference to FIGS. 6 to 8.

In this embodiment, four permanent magnets are arranged around the bobbin 11 to increase the horizontal drive force to the bobbin 11. Short permanent magnets 41 and 42 are arranged between the first-mentioned permanent magnets 24 and 25 and they are shifted downwardly from the first permanent magnets 24 and 25. The pair of horizontal drive coils 22 and 23 are attached diametrically to the lower circumferential surface of the bobbin 11, and the vertical drive coil 21 is attached to the upper circumferential surface of the bobbin 11. In contrast to the first embodiment, the horizontal drive coils 22 and 23 are separated from the vertical drive coil 21. The magnets 41 and 42 are magnetized in the opposite directions to the first magnets 24 and 25, the inner circumferences of the magnets 41 and 42 of S-polarity and the outer circumferences of N-polarity. A larger torque is imparted to the bobbin 11 with energization of the horizontal drive coils 22 and 23 by the four magnets 24, 25, 41 and 42, than in the first embodiment. Magnetic fluxes from the magnets 24 and 25, 41 and 42 intersect with the horizontal drive coils 22 and 23. When the vertical drive coil 21 is energized, a downward force is imparted to the bobbin 11. The magnetic fluxes from the magnets 24 and 25 intersect with the vertical drive coil 21. Since the second magnets 41 and 42 are shifted downwardly from the vertical drive coil 21, the magnetic fluxes from the second magnets 41 and 42 do not intersect with the vertical drive coil 21. Accordingly, a force to cancel the downward force due to the magnets 24 and 25 is not imparted to the bobbin 11 by the magnets 41 and 42.

Figure 9A:
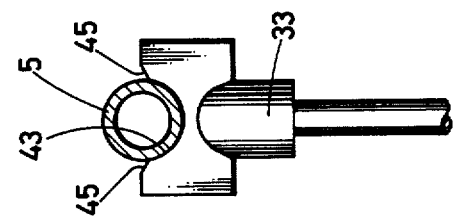
FIG. 9A to FIG. 9C are enlarged front views of modifications of the arm lifter.
Figure 9B:
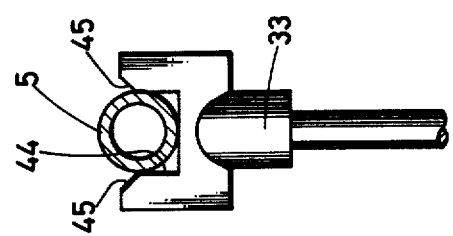
Figure 9C:
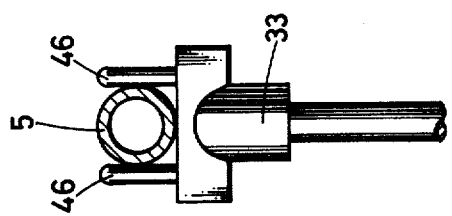

Modifications of the arm lifter 33 are also possible as will now be described with reference to FIGS. 9A to 9C.

As above described, in FIG. 5, the V-shaped recess 34 is formed in the arm lifter 33 in order to prevent a horizontal deflection of the tone arm 5 and thus obtain an accurate drop or set down of the stylus. In FIG. 9A, a U-shaped recess 43 is formed in the arm lifter 33, instead of the V-shaped recess 34. In FIG. 9B, a rectangular recess 44 is formed in the arm lifter 33, instead of the V-shaped recess 34. It is preferable to form slants 45 in the recesses 43 and 44 so as to guide the tone arm 5 exactly into the recesses 43 and 44. In FIG. 9C, a pair of pins 46 are fixed in the arm lifter 33 in place of the V-shaped recess 34. Tops of the pins 46 are so rounded as to smoothly guide the tone arm 5 into the space between the pins 46.

Figure 10:
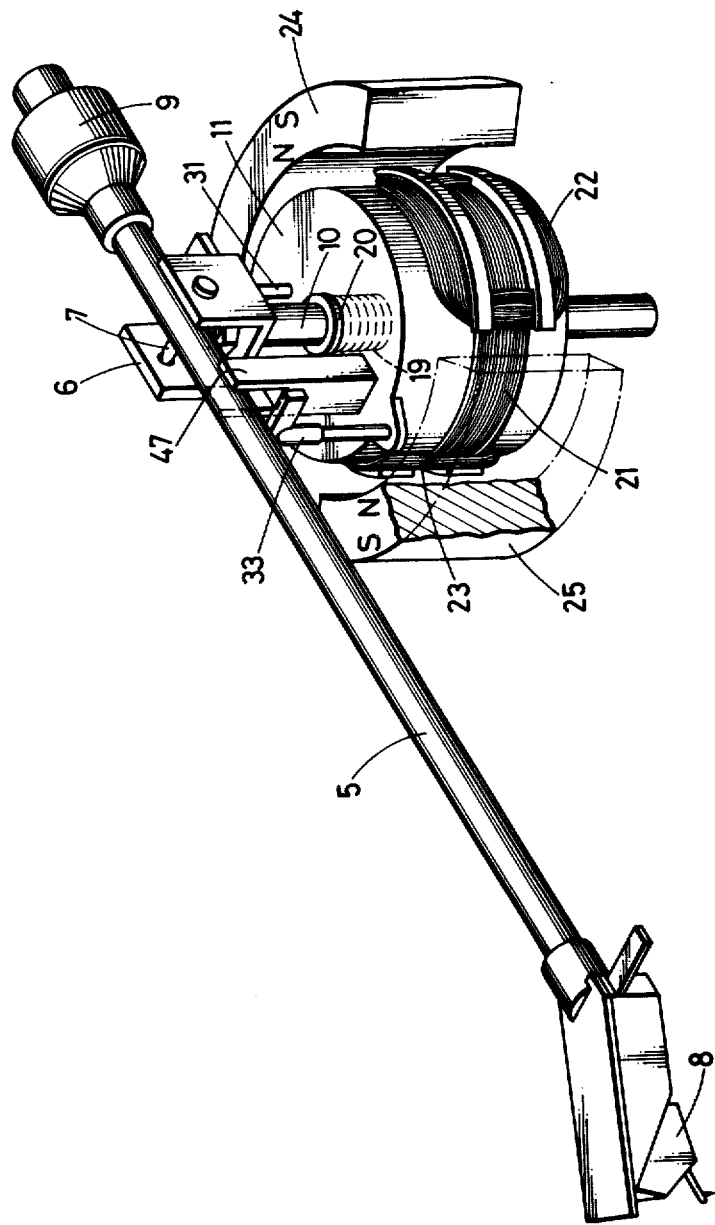
FIG. 10 is a perspective view of an important part of the tone arm driving apparatus provided with a guide member for preventing horizontal deflection of the tone arm during upward and downward movement.

FIG. 10 shows a further modification of the tone arm lifter 33 in the tone arm driving apparatus wherein the top end of the tone arm lifter 33 is flat. Adjacent to the tone arm 33, a guide post 47 having a rectangular recess is fixed on the bobbin 11. The height of the recess of the guide post 47 may be such that the tone arm during vertical movement is guided by the guide post 47 throughout a substantial portion of the vertical movement, with lesser heights and guidance also possible. There is some clearance between the tone arm 5 and the recess of the guide post 47 not so as to impede the vertical movement of the tone arm 5.

As above described in the tone arm driving apparatus according to the embodiments of this invention, the horizontal drive coil and vertical drive coil are attached to the single bobbin, and the magnet are arranged facing the drive coils. When the horizontal drive coil is energized, the torque is imparted to the bobbin to horizontally rotate the tone arm. When the vertical drive coil is energized, the vertical force is imparted to the bobbin to vertically rotate the tone arm. Thereby the tone arm driving apparatus according to the embodiments of this invention is simple and compact in construction, and in addition, can be manufactured at low cost. Further, since the tone arm is rotated horizontally and vertically in an electro-magnetic manner, the tone arm driving apparatus is superior in response, and can perform complicated operations.

When the horizontal detecting coil is attached to the bobbin, the horizontal rotational speed of the tone arm and the angular position thereof can be detected in a very simple arrangement. The detection of the end of the record and the speed servo control of the tone arm can be performed by the horizontal detecting coil.

While I have disclosed exemplary structures to illustrate the principles of the invention, it should be understood that I wish to embody within the scope of the patent warranted hereon, all such modifications as reasonably and properly come within the scope of my contribution to the art.

What is claimed is:

1. A tone arm driving apparatus comprising:
    (a) a tone arm supported by a first and second axis so as to be rotatable in both a horizontal and vertical direction;

(b) a cylindrical bobbin arranged concentrically with said first axis and supported by said first axis so as to be rotatable around said first axis and slidable in the vertical direction;

(c) at least one each of a horizontal and vertical drive coil attached to said bobbin which, when supplied with electric currents, generate electromagnetic forces for imparting to said bobbin a torque and a vertical drive force;

(d) a stationary permanent magnet arranged facing said horizontal and vertical drive coils to interlink magnetic fluxes therefrom with said horizontal and vertical drive coils;

(e) a pin fixed to said bobbin for transmitting said torque from the bobbin to the tone arm; and (f) an arm lifter fixed to said bobbin for transmitting said vertical drive force from the bobbin to the tone arm.

2. A tone arm driving apparatus according to claim 1, in which said vertical drive coil is wound on the periphery of said bobbin, and said horizontal drive coil is substantially in the form of rectangle, said torque being generated by the vertical portions of said horizontal drive coil.

3. A tone arm driving apparatus according to claim 2, in which an inductive coil for detecting the horizontal movement of said tone arm is further attached to said bobbin.

4. A tone arm driving apparatus according to claim 1, in which said stationary magnet is segmentary, and further comprising:

a stationary cylindrical yoke made of ferromagnetic material disposed within said bobbin, thereby forming a uniform magnetic field between said stationary magnet and said stationary cylindrical yoke.

5. A tone arm assembly according to claim 1, in which said horizontal drive coil consists of a pair of coil elements arranged diametrically with respect to said bobbin, and said stationary magnet consists of a pair of stationary segmental permanent magnets radially magnetized in the same polarity to interlink magnetic fluxes therefrom with said vertical drive coil and said pair of coil elements.

6. A tone arm driving apparatus according to claim 5, in which a further pair of stationary segmental magnets are arranged between said first-mentioned pair of stationary segmental magnets, being radially magnetized in the opposite polarity to said first-mentioned pair of stationary segmental magnets, and interlinking magnetic fluxes therefrom only with said pair of coil elements.

7. A tone arm driving apparatus according to claim 1, in which means for biasing upwards said bobbin is arranged with said bobbin, and when said vertical drive coil is energized, said bobbin is moved downwards by an electro-magnetic force generated by said energized vertical drive coil against said biasing means.

8. A tone arm driving apparatus according to claim 1, in which a recess for receiving said tone arm is formed in said arm lifter.

9. A tone arm driving apparatus according to claim 1, in which a guide member having a pair of vertical arms is fixed to said bobbin, guiding said tone arm during its vertical movement.

10. A tone arm driving apparatus for a phonographic record player comprising:

(a) a tone arm;

(b) a first shaft vertically disposed for supporting said tone arm and for rotating said tone arm on a horizontal plane;

(c) a second shaft horizontally disposed for supporting said tone arm and for rotating said tone arm on a vertical plane;

(d) a cylindrical bobbin coaxially supported by said first shaft, said bobbin being rotatable and axially slidable relative to said first shaft;

(e) at least one horizontal driving coil mounted on said cylindrical bobbin for generating a horizontal driving force when supplied with electric currents;

(f) a vertical driving coil mounted on said cylindrical bobbin for generating a vertical driving force when supplied with electric currents;

(g) a stationary permanent magnet disposed facing said horizontal driving coil and said vertical driving coil for generating magnetic fluxes to interlink with the fluxes generated by said driving coils;

(h) means to transmit said horizontal driving force from said cylindrical bobbin to said tone arm; and (i) means to transmit said vertical driving force from said cylindrical bobbin to said tone arm.

* * * * *